Patented Oct. 8, 1940

2,217,163

UNITED STATES PATENT OFFICE 2,217,163

PLASTIC COMPOSITION

David A. Fletcher, Arlington, N. J., assignor to E. I. du Pont de Nemours & Company, Wilmington, Del., a corporation of Delaware No Drawing. Application March 7, 1939, Serial No. 260,339

8 Claims. (Cl. 260—36)

This invention relates to plastic compositions and, more particularly, to molding compositions having a base of polyvinyl formal resin.

Polyvinyl formal resins belong to that class of synthetic resins known as polyvinyl acetals and which are prepared by effecting a complete or partial hydrolysis of a polyvinyl ester, usually polyvinyl acetate, and a complete or partial condensation of the resulting hydroxyl groups with an aldehyde. In the instance of polyvinyl formal resins, the hydroxyl groups are condensed with formaldehyde. The preparation of polyvinyl formal resins and the various modified properties that may be obtained through only partial hydrolysis of the polyvinyl ester and/or partial condensation of the resulting hydroxyl groups with formaldehyde are known in the art.

Because of the relatively low thermoplasticity of polyvinyl formal resins, and in order to enhance the toughness and impact-resistance of the resulting molded articles, these resins have been used in admixture with plasticizers but the development of satisfactory compositions has heretofore been limited by the difficulty of achieving in combination, in a single composition, a relatively low molding temperature, a relatively high softening temperature, and a high degree of toughness and impact-resistance. This difficulty has been, of course, in line with that experienced with other plastics, i. e., that toughness and ease of molding, on the one hand, and softening temperature, on the other hand, are contradictory requirements, in that the addition of plasticizer to achieve toughness and low molding temperature has the result of undesirably lowering the softening temperature of the ultimate molded article.

It is an object of the present invention to provide compositions having a base of polyvinyl formal resin and which are outstanding in that they are readily moldable and of unusually high toughness and impact-resistance while at the same time possessing softening temperatures distinctly higher than have heretofore been associated with comparable toughness and moldability. A further object is the formulation of compositions of high form-stability. A further object is the improvement of the water-resistance of polyvinyl formal resins. Other objects of the invention will appear from the description given hereinafter.

The above objects are accomplished according to the present invention by using, as a plasticizer for polyvinyl formal resin in plastic compositions, an alkyl phthalate of the formula $C_6H_4(COOR)_2$ wherein R is a saturated alkyl radical of 6–8 carbon atoms, inclusive. More specifically, the invention comprises a molding composition of 100 parts of a polyvinyl formal resin, up to 25 parts and, preferably, from 8–19 parts, of an alkyl phthalate or a mixture of alkyl phthalates falling within the above type formula, and, preferably, 1–6 parts of a mold lubricant.

Throughout the specification and claims all parts are given by weight.

Any single one of the alkyl phthalates of the formula $C_6H_4(COOR)_2$ wherein R is a saturated alkyl radical of 6–8 carbon atoms, inclusive, may be used in the present invention or a mixture of two or more of these phthalates in any proportion may be used but these phthalates are available commercially as a mixture including the esters of the various saturated aliphatic alcohols having between 6–8 carbon atoms, inclusive, and in actual practice no appreciable advantage has been found in using any single ester or incomplete mixture of esters over using the complete mixture such as sold commercially.

The following examples, in which the alkyl phthalates herein considered are simply designated by the formula $C_6H_4(COOR)_2$ for convenience, illustrate specific compositions coming within the scope of the invention:

Example I

| | Parts |
|---|---|
| Polyvinyl formal resin | 100 |
| $C_6H_4(COOR)_2$ | 9 |
| Aluminum palmitate | 1 |

Example II

| | Parts |
|---|---|
| Polyvinyl formal resin | 100 |
| $C_6H_4(COOR)_2$ | 13 |
| Stearic acid | 2 |

Example III

| | Parts |
|---|---|
| Polyvinyl formal resin | 100 |
| $C_6H_4(COOR)_2$ | 18 |
| Magnesium stearate | 4 |

Example IV

| | Parts |
|---|---|
| Polyvinyl formal resin | 100 |
| $C_6H_4(COOR)_2$ | 22 |

Example V

| | Parts |
|---|---|
| Polyvinyl formal resin | 100 |
| $C_6H_4(COOR)_2$ | 25 |
| Zinc stearate | 5 |

Example VI

| | Parts |
|---|---|
| Polyvinyl formal resin | 100 |
| $C_6H_4(COOR)_2$ | 25 |
| "Opalwax" | 1 |

Example VII

| | Parts |
|---|---|
| Polyvinyl formal resin | 100 |
| $C_6H_4(COOR)_2$ | 8 |
| Diethyl phthalate | 4 |
| Magnesium stearate | 4 |

Example VIII

| | Parts |
|---|---|
| Polyvinyl formal resin | 100 |
| $C_6H_4(COOR)_2$ | 12 |
| Tributyl phosphate | 3 |
| Aluminum palmitate | 6 |

Example IX

| | Parts |
|---|---|
| Polyvinyl formal resin | 100 |
| $C_6H_4(COOR)_2$ | 10 |
| Dimethyl phthalate | 9 |
| Magnesium stearate | 5 |

It will be understood that the above examples are merely illustrative, the invention in its broadest phase comprising plasticizing a polyvinyl formal resin with one or a mixture of alkyl phthalates of the formula $C_6H_4(COOR)_2$ wherein R is a saturated alkyl chain of from 6–8 carbon atoms, inclusive.

The present invention is broadly applicable to those polyvinyl formal resins in which the content of polyvinyl alcohol is less than about 20% by weight. Above this approximate limit on the polyvinyl alcohol content the moisture-sensitivity of the resin increases and its compatibility with the plasticizer decreases sufficiently to make the resin less desirable for purposes of molding.

Examples 7, 8, and 9 illustrate the use of a composite plasticizer, predominantly

$$C_6H_4(COOR)_2,$$

but containing an appreciable proportion of a conventional plasticizer. Such composite plasticizers may be used successfully to get particular effects in some instances but, as the proportion of $C_6H_4(COOR)_2$ is reduced, the valuable properties imparted to the plastic by it are, of course, diminished. The incorporation of the plasticizer, mold lubricant, or any auxiliary ingredients with the resin, may be effected by any of the several methods known in the art. In accordance with customary practice, various ingredients such as dyestuffs, pigments, effect materials, fillers, and the like, may be included in the composition.

The proportion of the plasticizer $C_6H_4(COOR)_2$ to be used with a polyvinyl formal resin will depend both upon the character of the specific resin, and particularly upon its viscosity, and also upon the requirements to be met, as regards both molding conditions and the toughness and softening temperature of the molded article. For most purposes, the proportions will range from about 8 to about 19 parts of the plasticizer per 100 parts of the resin but the plasticizer may be usefully employed in proportions smaller than this, particularly in conjunction with other plasticizers, and it may in some cases be used in proportions as high as 25 parts per 100 parts of polyvinyl formal resin. In general, higher contents of the plasticizer will be desirable in compositions intended for injection molding than in those intended for compression molding.

As the examples illustrate, various conventional mold lubricants may be advantageously used although, to some extent, the herein considered plasticizer functions as a mold lubricant as well as a plasticizer. The mold lubricants tend to promote smoothness of surface of the molded article and facilitate its removal from the mold. Among such mold lubricants may be mentioned magnesium stearate, zinc stearate, aluminum palmitate and other colorless metallic soaps, stearic acid, stearyl alcohol, lauryl alcohol, ethyl palmitate, "Opalwax", and the like. They will be used in conventional proportions, usually of the order of from about 1 to about 6 parts per 100 parts of the resin.

The compositions herein contemplated are primarily adapted as molding compositions but are also of value in the formation of sheets, rods, and tubes.

One of the outstanding advantages of polyvinyl formal resins plasticized with the herein considered plasticizer is found in the combination of great toughness and high softening temperature of resins so plasticized as compared with the much lower values exhibited by the same resins plasticized with similar proportions of other plasticizers. This is strikingly illustrated in the following table in which the same polyvinyl formal resin has been used in all of the compositions. This table also shows the excellent form stability of polyvinyl formal compositions employing the herein considered plasticizer.

| Plasticizer | Parts per 100 of resin | Lubricant | Parts per 100 of resin | Impact strength, (ft. lbs.) | Soft. temp., °C. | Percentage unmolding at— | |
|---|---|---|---|---|---|---|---|
| | | | | | | 50° C. | 70° C. |
| $C_6H_4(COOR)_2$ | 18.3 | Magnesium stearate | 3.7 | 6.98 | 71 | 0 | 1.5 |
| Tributylphosphate | 18.3 | ...do... | 3.7 | 5.68 | *Low | 0.5 | ...... |
| Ethoxy ethylphthalate | 21.8 | Zinc stearate | 6.4 | 3.68 | *Low | 3.0 | ...... |
| Dimethylsebacate | 18.3 | Magnesium stearate | 3.7 | 3.56 | 49 | 3.1 | ...... |
| Dimethylphthalate | 18.3 | ...do... | 3.7 | 2.66 | 46 | 3.4 | 7.5 |
| Diethylphthalate | 18.3 | ...do... | 3.7 | 2.22 | 45 | 4.0 | 9.6 |
| Do | 12.2 | ...do... | 3.7 | 2.08 | 55 | 1.5 | ...... |
| Dimethylphthalate | 6.1 | ...do... | 3.7 | 2.08 | 55 | 1.5 | ...... |
| Dibutylphthalate | 18.8 | ...do... | 6.3 | 1.90 | *Low | ...... | ...... |
| Dibutyltartare | 18.3 | ...do... | 3.7 | 1.54 | 45 | 4.8 | 11.5 |
| Dicyclohexylphthalate | 18.3 | ...do... | 3.7 | 1.26 | 63 | 0 | 2.2 |

* Exact value not determined.

It will be observed that the composition typifying the invention, appearing as the first item in this tabulation, presents a combination of high impact strength, high softening temperature and excellent form-stability not approached by any of the other compositions, which typify those of the prior art.

The following tests were used in establishing the data in the above table:

*Impact Test (Charpy)*—This has been conducted as prescribed by the American Society for Testing Materials, with test specimens approximately 0.250 inch thick. The values given are those calculated for a thickness 1.000 inch, after measurement of the actual thicknesses of the respective specimens, on the assumption that the energy required to break is proportional to the thickness.

*Determination of Softening Temperature*—The test specimen is a molded strip of dimensions 2.50 x 0.50 x 0.50 inches. It is conditioned, prior to being tested, by storage for at least 24 hours at room temperature and at 45% relative humidity. With the 2.50 dimension horizontal and the 0.50 inch dimension vertical, the specimen is clamped at one end in a device adapted to be lowered beneath the surface of a bath of "Nujol" or similar refined mineral oil. A weight of 27.5 grams is now applied near the free end of the piece, the arm of this weight, which tends to deflect the specimen as a beam, being 2.0 inches. The specimen is immersed in the oil bath, which is heated at a rate of from 2 to 3 degrees per minute. An electrical contact gives an alarm when the weight has dropped by 0.06 inch from its initial position. The temperature of the oil at this moment is reported as the softening temperature of the specimen.

*Test of Unmolding*—An injection-molded circular test piece formed in a mold cavity of diameter 1.5 inches and thickness 0.11 inch, gated at the edge, is stored at a temperature of 50° C., in air, for 24 hours. The resulting decrease in diameter, as measured from the gate to the opposite edge, as a percentage of the initial diameter, is reported as "percentage of unmolding." Absence of shrinkage indicates complete form-stability at this temperature; high values are correspondingly undesirable as indications of the lack of form-stability. A similar test is conducted at 70° C.

The plasticizer $C_6H_4(COOR)_2$ is also advantageous in that it tends to reduce moisture absorption of polyvinyl formal resins plasticized with it as compared to the moisture absorption of the same resins plasticized with conventional plasticizers.

As many apparently widely different embodiments of this invention may be made without departing from the spirit and scope thereof, it is to be understood that the invention is not limited to the specific embodiments thereof except as defined in the appended claims.

I claim:

1. A plastic composition comprising a polyvinyl formal resin and, as a plasticizer therefor, an alkyl phthalate of the formula $C_6H_4(COOR)_2$, wherein R is a saturated alkyl chain of 6–8 carbon atoms, inclusive.

2. A plastic composition comprising a polyvinyl formal resin and, as a plasticizer therefor, a mixture of alkyl phthalates of the formula $C_6H_4(COOR)_2$, wherein R is a saturated alkyl chain of 6–8 carbon atoms, inclusive.

3. A plastic composition comprising 100 parts of a polyvinyl formal resin and, as a plasticizer therefor, up to 25 parts of a mixture of alkyl phthalates of the formula $C_6H_4(COOR)_2$, wherein R is a saturated alkyl chain of 6–8 carbon atoms, inclusive.

4. A plastic composition comprising 100 parts of a polyvinyl formal resin and, as a plasticizer therefor, from 8 to 19 parts of an alkyl phthalate of the formula $C_6H_4(COOR)_2$, wherein R is a saturated alkyl chain of 6–8 carbon atoms, inclusive.

5. A molding composition comprising a polyvinyl formal resin and, as a plasticizer therefor, an alkyl phthalate of the formula $C_6H_4(COOR)_2$, wherein R is a saturated alkyl chain of 6–8 carbon atoms, inclusive, together with a mold lubricant.

6. A molding composition comprising a polyvinyl formal resin and, as a plasticizer therefor, a mixture of alkyl phthalates of the formula $C_6H_4(COOR)_2$, wherein R is a saturated alkyl chain of 6–8 carbon atoms, inclusive, together with a mold lubricant.

7. A molding composition comprising 100 parts of a polyvinyl formal resin and, as a plasticizer therefor, up to 25 parts of a mixture of alkyl phthalates of the formula $C_6H_4(COOR)_2$, wherein R is a saturated alkyl chain of 6–8 carbon atoms, inclusive, together with a mold lubricant.

8. A molding composition comprising 100 parts of a polyvinyl formal resin and, as a plasticizer therefor, from 8 to 19 parts of an alkyl pathalate of the formula $C_6H_4(COOR)_2$, wherein R is a saturated alkyl chain of 6–8 carbon atoms, inclusive, together with a mold lubricant.

DAVID A. FLETCHER.

CERTIFICATE OF CORRECTION.

Patent No. 2,217,163.　　　　　　　　　　　　　October 8, 1940.

DAVID A. FLETCHER.

It is hereby certified that error appears in the printed specification of the above numbered patent requiring correction as follows: Page 2, first column, line 62, in the table, for "dibutyltartare" read --dibutyltartrate-- and that the said Letters Patent should be read with this correction therein that the same may conform to the record of the case in the Patent Office.

Signed and sealed this 12th day of November, A. D. 1940.

(Seal)

Henry Van Arsdale,
ting Commissioner of Patents.